United States Patent Office 2,923,151
Patented Feb. 2, 1960

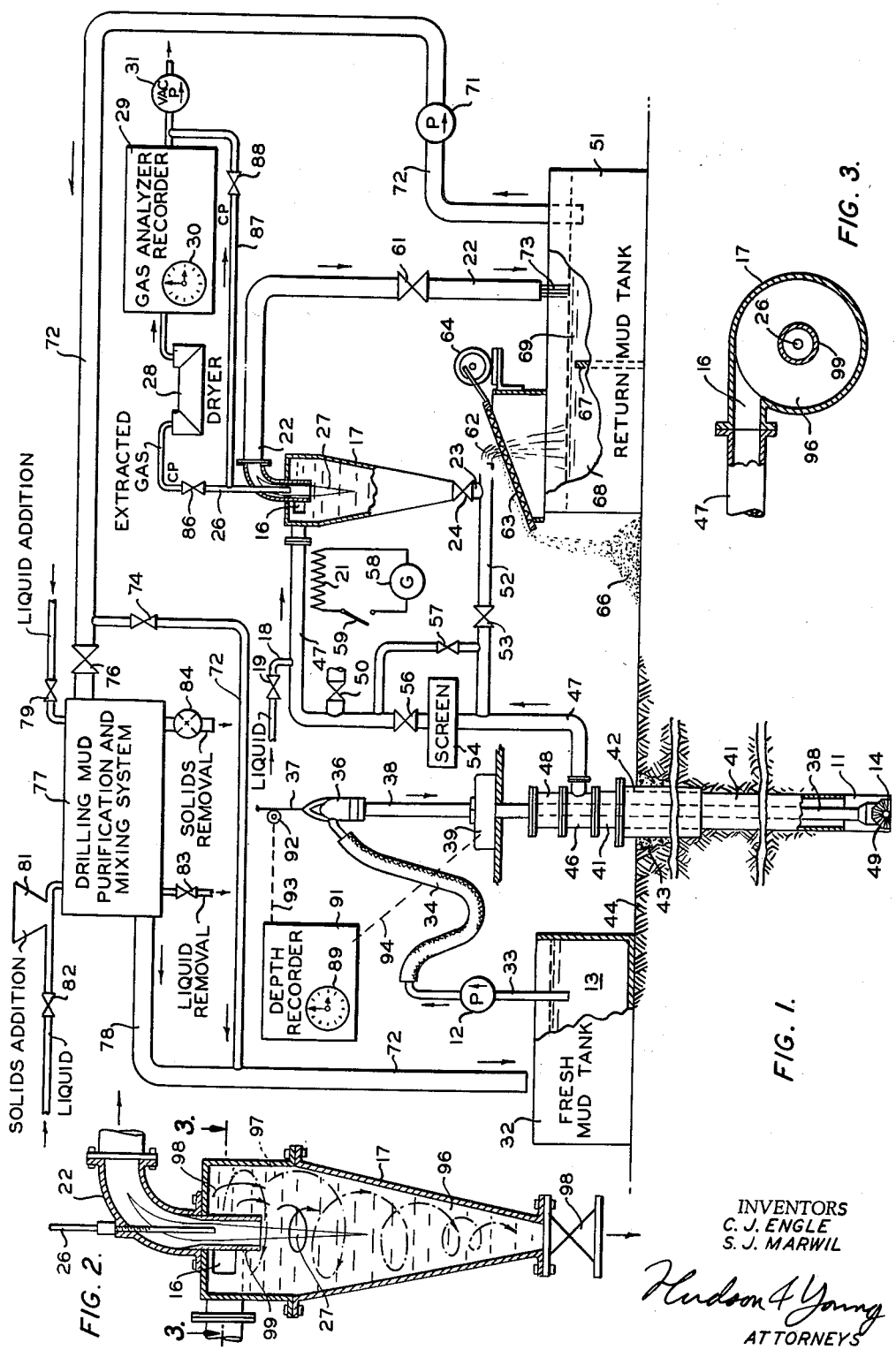

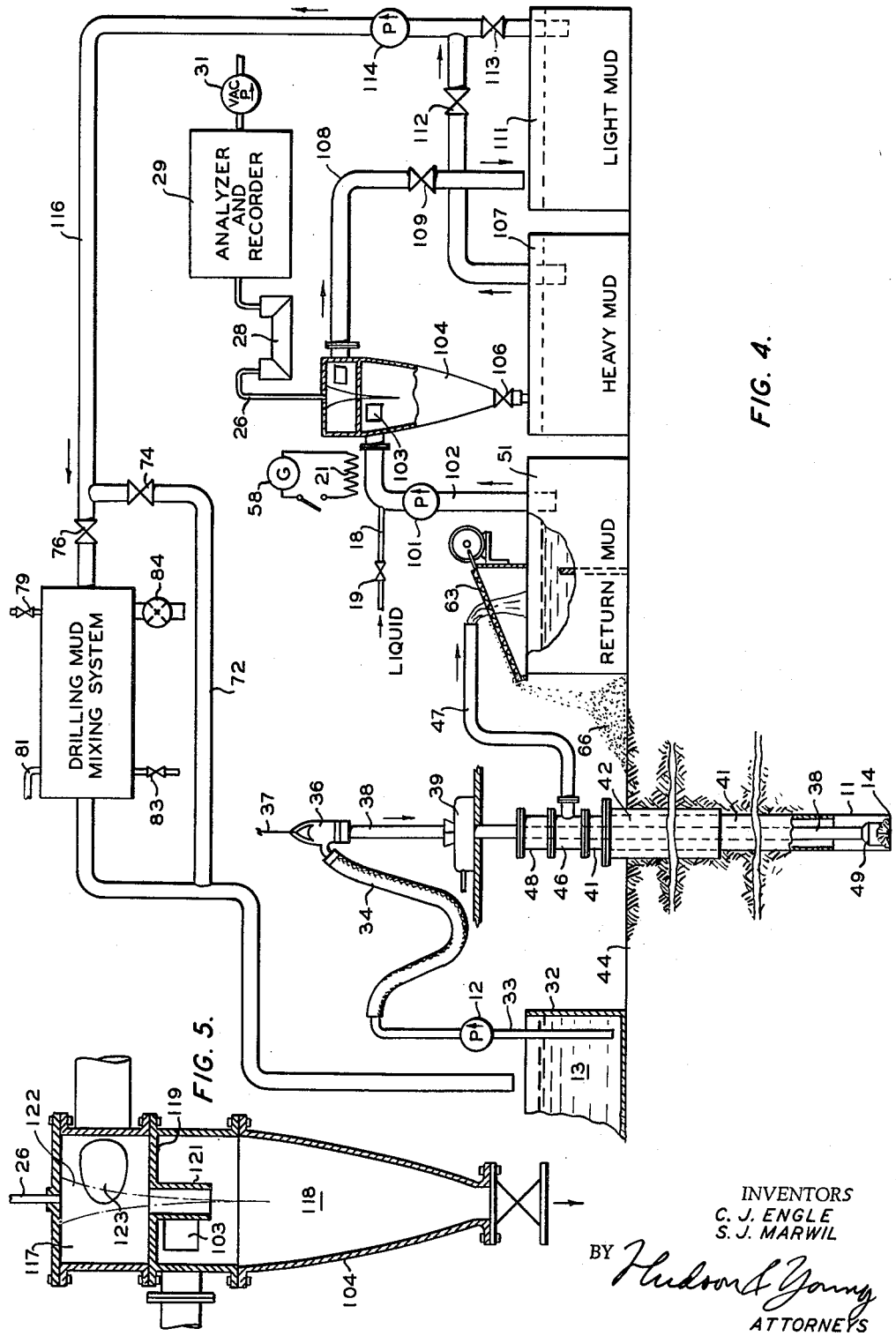

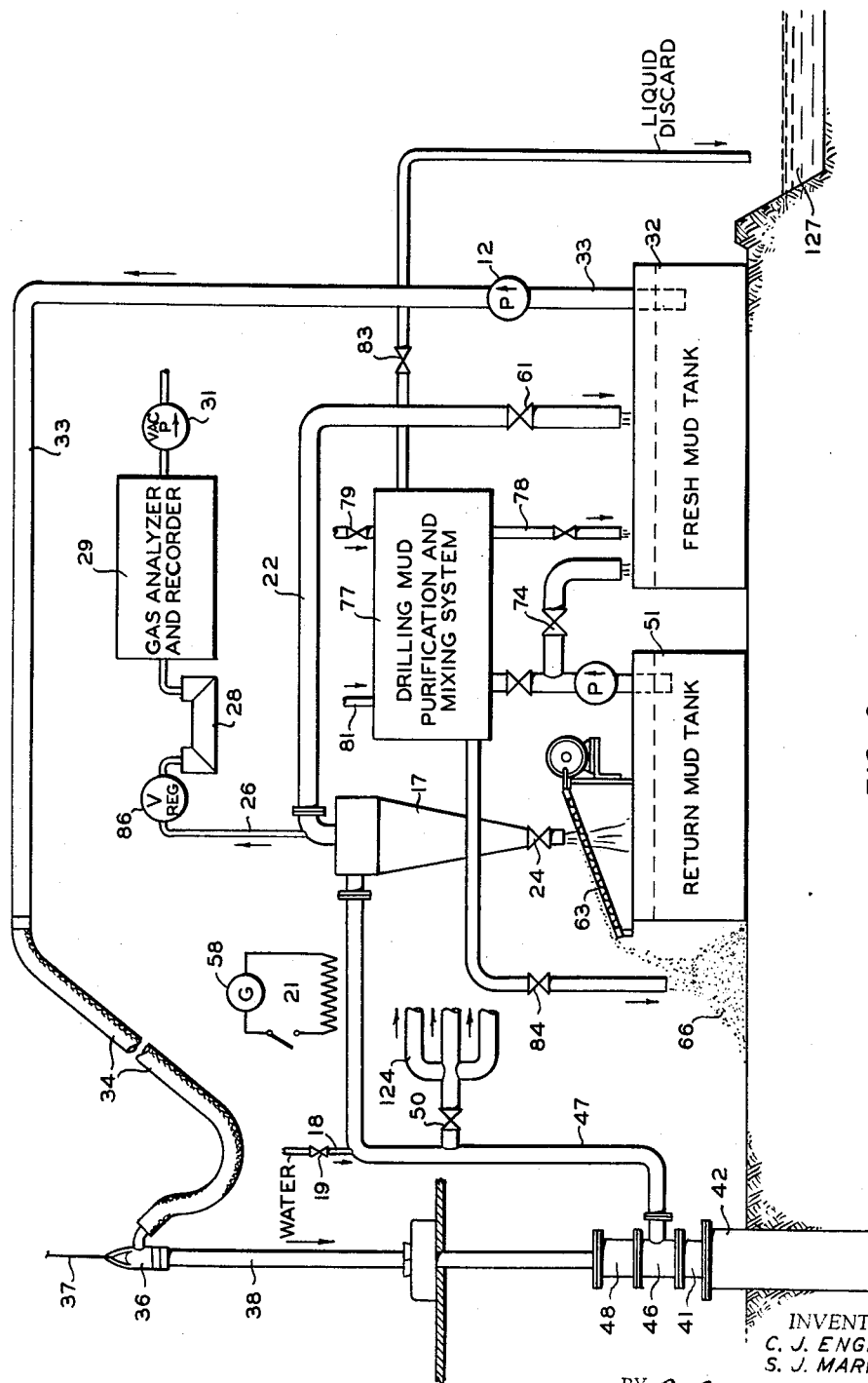

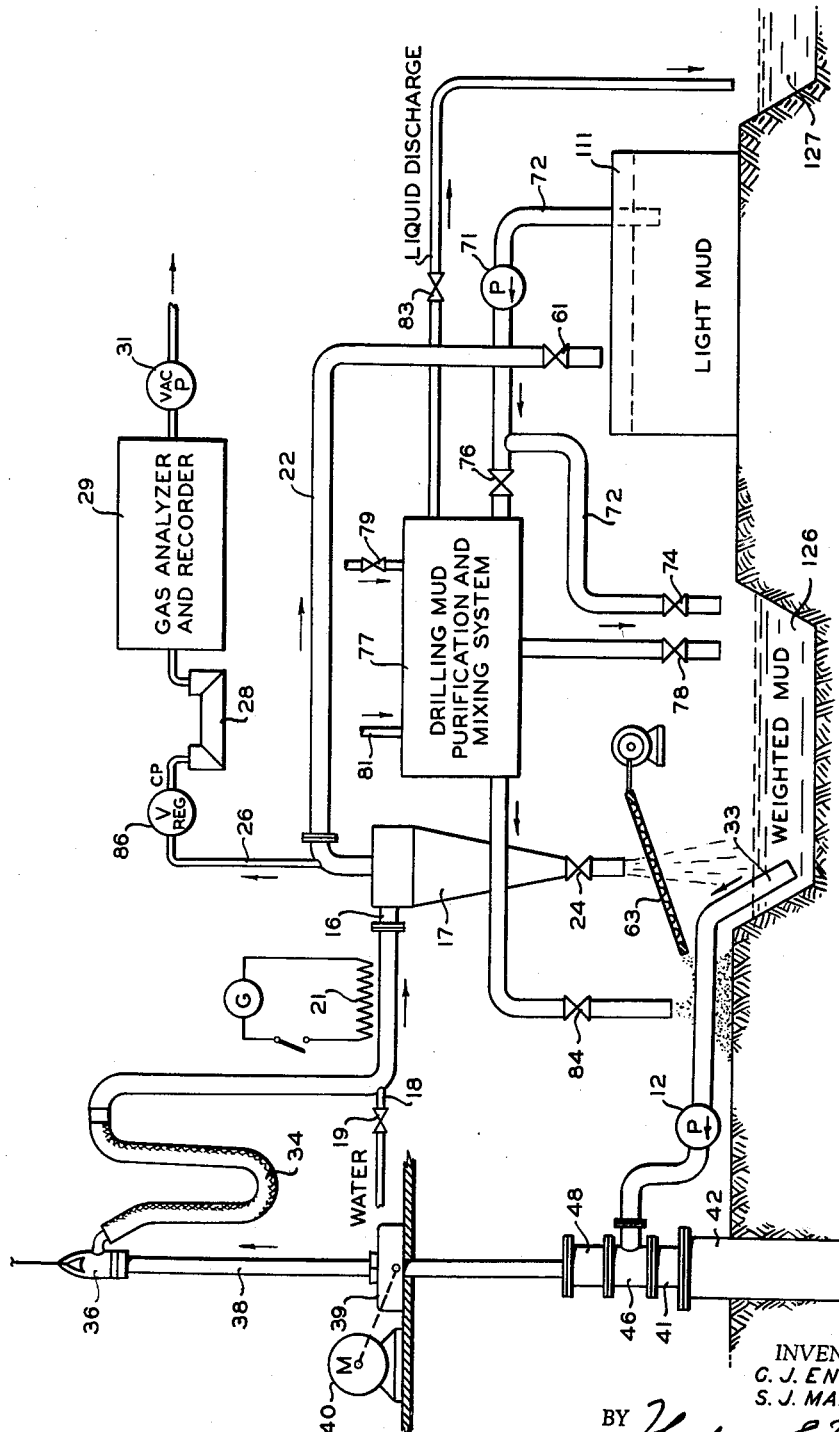

2,923,151

EXTRACTING AND ANALYZING GAS FROM WELL DRILLING MUD

Charles J. Engle and Stanley J. Marwil, Bartlesville, Okla., assignors to Phillips Petroleum Company, a corporation of Delaware Application December 17, 1956, Serial No. 628,884

8 Claims. (Cl. 73—153)

This invention relates to extracting gas from well drilling mud by passing the same tangentially into a hydraulic cyclone and removing the gas from the resulting vortex created therein. In one aspect it relates to analyzing at least a portion of said extracted gas for certain components, such as hydrocarbon gases, which would indicate the presence of oil and/or gas in the formations penetrated by the well. In another aspect it relates to a gas extraction process suitable for use in logging the hydrocarbons released from the cuttings into the drilling mud during drilling. One aspect of this invention is to utilize the force of the conventional mud circulation pump to not only force the drilling mud into and out of the well, but to provide the force necessary to the operation of a hydraulic cyclone gas extraction unit.

In the drilling of wells by the rotary well drilling process, it is customary to employ well drilling mud comprising a liquid such as water, or oil, or emulsions of either one of these liquids dispersed in the other. This well drilling mud is pumped down through the drill stem to emerge into the well through openings in the drill bit and return to the surface through the annular space around the drill stem, cooling the bit and carrying cuttings to the surface; or alternatively, it is quite customary to reverse this circulation by forcing mud down the annular space and back through the drill stem. In order to prevent gas and oil under high pressure in earth formations penetrated from blowing the drilling mud out of the hole, sufficient hydraulic head is applied to the drilling mud adjacent the formation to overbalance the formation pressure. This head can be increased by adding weighting materials to the drilling mud, preferably finely ground barium sulfate, or iron oxides, or lead oxides. Various clays and chemicals are added if desired to maintain the solids dispersed in the mud, and natural additions of sand or clay to the mud occur in drilling through different formations.

As the drilling mud must have a greater hydraulic head than the pressure in the adjacent formation to prevent blow-outs, it is necessary that excessive water-loss (or liquid-loss) from the drilling mud to the formation be prevented so that the oil or gas formations will not be injured by water. This prevention occurs more or less naturally due to the solids suspended in the drilling mud forming a filter cake on the wall of the well, but the efficiency of the filter cake can be increased and its thickness decreased by use of suitable chemicals such as sodium carboxymethyl cellulose. While the filter cake and superior pressure prevent hydrocarbons from entering the walls of the well, the drilling bit is continuously disintegrating the formation at the bottom of the well, and thereby releasing the hydrocarbons from the same into the drilling mud regardless of relative pressure.

It is an object of the present invention to extract said hydrocarbons entering the drilling mud from said cuttings, extracting said hydrocarbons in the form of a gas or vapor in a hydraulic cyclone vortex with the aid of heat if necessary, and by analyzing and recording said hydrocarbon content relative to the known time, and by keeping the usual time record of the depth of the well, making a log of the hydrocarbon content of the formations penetrated by the well. This enables the well to be drilled with superior pressure in the well drilling mud and yet not pass through oil or gas sands of economic value without having a record of their presence.

In the rotary drilling of wells some difficulty has been experienced by the tendency of well drilling mud to accumulate gas progressively as it is cycled through the well a number of times, which is likely to cause a sudden release of gas bubbles in the returning mud, with a resulting lightening of the hydraulic head on the mud, and the possibility of the formation pressure blowing the lightened mud out of the well.

It is an object of the present invention to provide a means for extracting gas from the drilling mud in a hydraulic cyclone, which is useful per se in preventing the progressive increase in gas content of the drilling mud, and thereby to prevent danger of a blow-out, regardless of whether the gas is analyzed or not.

One object of the present invention is to provide suitable processes for the extraction of gas, or hydrocarbon vapors, from well drilling mud, either with or without analysis of said gas correlated with the elevation in the well of the formation that was being drilled at the time the increment of drilling mud from which the gas is being extracted was adjacent the drilling bit.

Another object is to provide novel apparatus, and systems employing the same for carrying out said process.

Another object is to provide an improved process of extracting hydrocarbons from drilling muds, making use of a cyclone separator which is also employed to separate drilling cuttings from the well drilling mud, or to recover weighting materials, such as barium sulfate, from the well drilling mud, and thus obtain a double use for the forces generated in a liquid cyclone separator.

Numerous other objects and advantages will be apparent to those skilled in the art upon reading the accompanying specification, claims, and drawings.

In the drawings:

Figure 1 is an elevational view with some parts in cross section showing a drilling well having a first species of gas extracting system embodying the present invention.

Figure 2 is an enlarged elevational view in cross section of the hydraulic cyclone chamber employed in Figure 1 showing the vortex of gas formed in the drilling mud by the circulation of various liquid components therein as indicated by the arrows therein.

Figure 3 is a cross-sectional view of the apparatus shown in Figure 2 taken along the line 3—3 looking in the direction indicated.

Figure 4 is a view similar to Figure 1, but showing a separate species of apparatus embodying the invention.

Figure 5 is an enlarged elevational cross-sectional view of the specific hydraulic cyclone employed in Figure 4, and bears the same relation to Figure 4 that Figure 2 does to Figure 1.

Figure 6 is a view similar to Figure 1 of a third species of apparatus embodying the present invention.

Figure 7 is a view similar to Figure 1 of a fourth species of apparatus embodying the present invention.

In Figure 1 is shown a first species of a system for extracting and analyzing gas from well drilling mud from a well 11. It should be noted from the preceding discussion that it is also of value merely to extract the gas from the well drilling mud to prevent the gas from building up in the mud, even if there is no analysis of the gas. The system comprises in combination pumping means 12, which may consist of the usual mud pump used in circulating the well drilling mud during rotary drilling, connected to force well drilling mud 13 down said well 11 through the drilling zone 14 and up said well and then tangentially through inlet 16 into the base of an inverted generally conical liquid-liquid cyclone separation chamber 17, with means comprising pipe 18 and valve 19 for adding water to said drilling mud prior to said tangential introduction into said chamber if desired, a heater 21 disposed to heat said drilling mud if desired prior to said tangential introduction into said chamber, said chamber having an axial overflow outlet 22 adjacent the base of said cone, an axial overflow outlet 23 controlled by valve 24 adjacent the apex of said cone, and a gas outlet tube 26 disposed axially adjacent said base and positioned to draw gas out of the resulting vortex 27 in the drilling mud in said chamber 17, and a gas drier 28, a gas analyzer recorder 29 driven by the usual clock 30, and a vacuum pump 31 disposed in said gas outlet tube 26.

In Figure 1 a supply of fresh drilling mud 13 is allowed to accumulate in tank 32 from which it is drawn by the suction of mud pump 12 through line 33, passing through a flexible connecting conduit 34 to the usual rotary drilling mud swivel 36 suspended from the crown block of the derrick (not shown because conventional) by the usual hoist line 37. The upper end of the drill stem 38 is swivelly connected to receive mud from swivel 36 and drill stem 38 is rotated by being slidably but non-rotatably coupled to a suitable rotary table 39 rotated by a prime mover (not shown in Figure 1, but shown as motor 40 in Figure 7). Well 11 may contain the usual strings of casing 41 and 42, the outer of which is generally cemented at 43 to seal off the top of the well by sealing casing 42 to the ground 44. Mounted on top of casing 41, for example, is a casing head 46 connected in communication with a flow line 47, and unless flow line 47 is located at an elevation from which it can proceed downwardly, it is necessary to provide a rotary stuffing box seal 48 to provide a sliding and rotating hydraulic seal between the drill stem 38 and the casing so that the returning mud will be forced through the pipe 46 and not escape around the drill stem 38.

While in most instances the drilling mud is circulated down drill stem 38, out openings in bit 49 adjacent cutting stem 14, and back up the annular space between 38 and 41 and out flow line 47, it is also common to use reverse circulation, in which case conduit 33 and pump 12 would be connected to 46 instead of 34, and 34 would be connected to 46 in place of conduit 47, the operation of the other portions of the system being the same as the system connected as shown, see Figure 7 showing reverse circulation.

While all of the drilling mud in pipe 47 may be passed through hydraulic cyclone 17, or through a plurality of hydraulic cyclones connected in parallel by a suitable valve 50 to flow line 47, which latter parallel arrangement is especially useful when it is desired to extract as much gas from the drilling mud as possible, it is preferable to close valve 50 and bypass the major portion of the drilling mud from pipe 47 to the return mud tank 51 through bypass line 52 controlled by valve 53. However, a build-up of the gas in the drilling mud may be prevented even if only a fraction of the mud being recycled is treated to remove the mud in the hydraulic cyclone if the rate of removal is equal to the rate of addition. A minor proportion of the mud then passes through screen 54 and valve 56, or bypasses screen 54 through valve 57 if desired, to continue its flow through flow line 47 into tangential inlet 16 of hydraulic cyclone 17.

The separation in cyclone 17 may be improved by adding a suitable amount of water through line 18 controlled by valve 19, or other liquid depending on the type of well drilling mud being used. If an oil base mud were being used, obviously oil would be added through line 18 intead of water. However, most well drilling mud is water base mud. The separation of hydrocarbons may also be improved if desired by heating the mud in flow line 47 with a suitable heater 21, which is shown as an electrical heater having any suitable source of electrical power such as generator 58, the heating circuit being completed by closing switch 59. Other methods of heating pipe 47 by gas flames (not shown) may be employed instead. If the gas analysis is to be for methane and/or ethane, no heater is needed, but for heavier hydrocarbons heat is desirable, or essential, in addition to the vacuum created by the hydraulic cyclone, depending on the hydrocarbons it is desired to test. If an oil base, or oil emulsion mud is used, the oil used in the mud must have a high flash point so substantially none evaporates to mingle with the lighter natural hydrocarbon additions being tested.

The character of separation that takes place in hydraulic cyclone 17 depends on the adjustment of outlet valve 24 in underflow line 23 and outlet valve 61 in overflow line 22, which regulates the pressure drop through the cyclone. It is often convenient to combine underflow pipe 23 with bypass pipe 52, but this is not necessary as pipe 23 could discharge separately from pipe 52. The drilling mud stream 62 emerging from pipes 25 and 52 passes through a reciprocating screen 63 reciprocated by motor 64, which screen is known as a shale shaker. The larger drilling cuttings from bit 49 will not pass through the screen 63, and due to reciprocation, screening, and gravity fall to one side in a pile of fairly dry cuttings 66.

The drilling mud 62 from which the larger cuttings 66 are removed by stream 62, passes into the return mud tank 51 which preferably contains a submerged dam or baffle 67 so that the finer cuttings, and sand, may separate to the left of the dam in a quiet portion 68 of the returned drilling mud. This sand can be shoveled out of the tank occasionally. The fine weighting material, such as barium sulfate, if any is used, especially if properly dispersed by an agent such as sodium carboxymethylcellulose, remains in the fluid state and passes over dam 67 into the right hand side 69 of tank 51 from which it may be transferred by transfer pump 71 and transfer line 72 to the fresh mud tank 32. Alternatively, tank 32 may be eliminated and the mud pump 12 can draw the mud through line 33 from the right hand side 69 of tank 51 directly either with or without any further modification of the drilling mud in portion 69 of tank 51.

In the species shown in Figure 1 the lighter portion of the drilling mud 73 which is that portion containing the smaller and lighter particles overflowing from the hydraulic cyclone 17 through line 22, as distinguished from the underflow passing through line 23 containing the larger and heavier solid particles, is returned to the right side 69 of the return mud tank because it is free of sand removed in hydraulic cyclone 17.

The drilling mud 69 from which the gas 26, larger cuttings 66, and sand have been removed, is then recycled to mud pump 12 through line 72 and valve 74. From time to time it may be desirable to make further additions or subtractions from the various materials in mud 69, but it is generally preferable to remove the mud, or a portion thereof, from the system by opening valve 76 and at least partially closing valve 74, passing some of the mud through any suitable drilling mud purification and mixing system 77 of the prior art from which the purified mud returns to line 72 through line 78. As purification system 77 is no part of the present invention, it has been merely shown as a tank at which any liquids, such as water, which are desired may be added through valve 79 and any solids desired, such as sodium carboxymethyl cellulose, lime, sodium hydroxide, etc., can be added through a hopper 81 with or without addition of water through valve 82. If an oil base mud is used, it is desirable to add oil through valve 82 instead of water. Depending on the type of separation apparatus available in the conventional purification system 77 chosen, undesired liquid may be removed through valve 83 and undesired solids through star valve 84, the entire showing of system 77 being schematic as it is not essential to the present invention.

While there are gas analyzers and recorders 29 in the prior art capable of handling all of the gas evolved in vortex 27 of hydraulic cyclone 17, it is preferable with some analyzers to have a constant volume stream of gas to analyze, and this is easily provided by placing a constant pressure downstream regulating a valve 86 in conduit 26. While not necessary from the standpoint of sampling the gas, but to continue gas removal when gas is evolved at a higher rate than the amount passing through valve 86, it is then desirable to have a by-pass line 87 to take the remainder of the gas around the analyzer 29 through the vacuum pump 31, and the proper flow through this line 87 is easily maintained by providing a constant pressure upstream regulating valve 88 in conduit 87.

In order to have the gas analysis recorded by analyzer 29 correlated to the earth formation 14 from which it comes, it is necessary to observe the depth at which bit 49 is drilling at the time the bit gas analysis is recorded. This can be done by keeping track of the number and length of pieces of pipe comprising drilling stem 38 and the elevation of swivel 36 and recording the calculated depth in pencil on the gas analysis recorded as the same is made. There are many ways in which the depth and gas analysis can be correlated, using devices already disclosed in the prior art. A preferred way is shown in Figure 1 in which there are separate unconnected synchronized clocks 30 and 89, clock 30 making time reference marks on the gas analysis data and clock 89 making time reference marks on the depth records of depth recorder 91. A number of such depth recorders are available in the prior art, the most successful having a roller 92 translating longitudinal movement of hoist line 37 to rotary motion through control shaft 93 to make an indication of depth in depth recorder 91. These prior art depth recorders also generally have a declutching control 94 actuated by suspending the weight of drill stem 38 from rotary table 39 to prevent the movements of roller 92 from changing the depth except when drill stem 38 is suspended from swivel 36 during drilling. However, this declutching device 94 is not essential as the character of such movements can be recognized from the graphical curve produced by the depth recorder.

It is also old in the prior art to make allowance (if the drilling is very fast) for the time it requires the gas to come from the bottom of the well at 14 up into vortex 27 and through pipe 26 and dryer 28 into the gas analyzer 29. It is obvious that all such engineering refinements and details can be devised and employed without invention in the practice in the present invention, and do not limit the present invention.

In Figure 2 is shown a hydraulic cyclone 17 of Figure 1 on a somewhat enlarged scale. It is desired to have a generally conical smooth walled chamber 96 into which the liquid to be separated is injected tangentially under pressure through inlet 16. The cone 96 need not be geometrically conical, as any irregular tapering will operate. The larger and heavier particles in the liquid travel in helical spirals as indicated by the dotted line arrow 97 down to the bottom of chamber 96, where a portion of the total flow from 16 is removed through valve 98 along with said heavier and coarser solids. Due to the relative effect of centrifugal force, the lighter and finer solids tend to be forced and displaced inwardly along the paths shown by the solid arrows 98; and as liquid is being removed through overflow line 22, said lighter and finer solids eventually pass into pipe 22.

While Figure 4 shows the same not to be essential, it is considered desirable in Figure 2 to provide a vortex-finder, or suction pipe 99 communicating between pipe 22 and chamber 96 and extending down into the latter at least below the elevation of inlet 16. This vortex-finder 99 stabilizes the fluctuations of the gas filled vortex 27 which is created in the drilling mud by centrifugal force. The gas from vortex 27 is removed by gas withdrawal tube 26 extending into said vortex. The finer and lighter solid particles segregate in that portion of the liquid which passes up and out overflow pipe 22. The same centrifugal force that forces the larger and heavier particles to the wall of chamber 96 and the lighter and finer particles to the surface of gas vortex 27 also acts to reduce the vapor pressure on the liquid and extract the gases or vapors therefrom into vortex 27. By passing liquid through pipe 22 and valve 61 through an elevation below hydraulic cyclone 17, it is possible to pull quite a vacuum in the vortex 27, as much or more than 70 inches of water vacuum being common. This vacuum aids the centrifugal force in removing the gas from the drilling mud passed through the hydraulic cyclone 17.

In Figure 3 the cross section taken of Figure 2 along the line of 3—3 shows the generally conical chamber 96 of cyclone 17, vortex-finder 99, gas extraction pipe 26, and tangential inlet 16.

In Figure 4 a second species of the invention is disclosed in which parts similar to those in Figure 1 are given the same numbers and are not described in detail. Instead of pipe 47 discharging into the hydraulic cyclone 17 as in Figure 1, in Figure 4 it discharges directly into return mud tank 51 through shale shaker 63. By making a return mud tank 51 of relatively small size, it is possible to pick up the mud therefrom through a transfer pump 101 in transfer line 102 and force the same tangentially through inlet 103 of hydraulic cyclone 104. Water or other suitable liquid may be added through line 18 controlled by valve 19 if desired and heat may be added by heater 21 if desired. The gas extracted through a pipe 26 is analyzed in the same manner as in Figure 1, and heavier and coarser particle containing mud passes through valve 106 into heavy mud tank 107, while the lighter and finer particle containing mud passes out the overflow through line 108 and valve 109 into light mud tank 111. The desired proportions, from 0 to 100% each, of the light and/or heavy mud may be collected by regulating valves 112 and 113 for transfer to the fresh mud tank by pump 114 through line 116.

In Figure 5 it will be noted that the hydraulic cyclone 104 which is tapered and generally conical, but not exactly conical, has an upper chamber 117 separated from lower chamber 118 by a partition 119 which may be provided with a depending vortex-finder tube 121 and a resulting vortex 122 forms in the upper chamber 117 against the top wall so that the gas extraction tube 26 may be flush therewith, the vortex action being aided by the overflow outlet 123 being tangential in the direction of rotation of the liquid in chamber 117 caused by the tangential entry of the liquid through inlet 103 in chamber 118.

Figure 6 shows a third modification of the system involving the present invention in which the light mud from the overflow pipe 22 of the hydraulic cyclone 17 is returned directly to the well by the mud pump 12 through the drill stem and the heavier underflow portion is transferred from the return mud tank 51 to the fresh mud tank 32 in control quantities through valve 74 or after being treated in system 77 through a return line 78. On valve 50 is shown a manifold 124 at which three more hydraulic cyclones like 17 may be connected in parallel with 17 and provided with gas extraction apparatus 26 as shown attached to 17, by which the volume of gas extracted and the proportion of mud treated may be increased to any desired amount.

Figure 7 shows a third system which is of especial value when weighting materials, such as barium sulfate, are used in order to save the cost thereof. In Figure 7 the hydraulic cyclone 17 discharges the concentrated barium sulfate into the weighted mud pit 126, and the lighter mud in the overflow 22 is returned in the desired proportion through valve 74 or passes through drilling mud purification system 77 and is returned through pipe 78. It will be noticed that reverse circulation is shown in that mud is pumped down the annular space of drill stem 38 and returned up the inside of drill stem 38, through swivel 36 and line 34 to the hydraulic cyclone 17. It could just as well be circulated in the other direction as shown in Figure 1 so far as the operation of the remainder of the system shown in Figure 7 is concerned. A pit 127 for receiving liquid discharged is shown in both Figures 6 and 7, but is implied in the other figures, it being common to dig whatever pits and ditches are necessary to dispose of unwanted materials or store the same for future use. Sometimes such materials are worth reworking for use in drilling mud and sometimes they are not, depending on many economic factors obvious to the particular situation with regard to scarcity or availability of water or other materials at the location of the well.

While several specific embodiments of the invention have been described for illustrative purposes, the invention is obviously not limited thereto.

Having described our invention, we claim:

1. A system for extracting and analyzing gas from well drilling mud from a well comprising in combination pumping means disposed and connected to force said well drilling mud down said well through said drilling zone and up said well tangentially into the base of an inverted generally conical liquid-liquid cyclone separation chamber, means for adding water to said drilling mud prior to said tangential introduction into said chamber, a heater disposed to heat said drilling mud prior to said tangential introduction into said chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber, and a constant downstream pressure regulating valve, a gas drier, a gas analyzer, and a vacuum pump disposed in said gas outlet tube.

2. A system for extracting gas from well drilling mud from a well comprising in combination pumping means disposed and connected to force said well drilling mud down said well through said drilling zone and up said well tangentially into the base of an inverted generally conical liquid-liquid cyclone separation chamber, means for adding water to said drilling mud prior to said tangential introduction into said chamber, a heater disposed to heat said drilling mud prior to said tangential introduction into said chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber.

3. A system for extracting and analyzing gas from well drilling mud comprising in combination pumping means disposed and connected to force said well drilling mud tangentially into the base of an inverted generally conical liquid-liquid cyclone separation chamber, means for adding water to said drilling mud prior to said tangential introduction into said chamber, a heater disposed to heat said drilling mud prior to said tangential introduction into said chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber, and a constant downstream pressure regulating valve, a gas drier, a gas analyzer, and a vacuum pump disposed in said gas outlet tube.

4. A system for extracting and analyzing gas from well drilling mud comprising in combination pumping means disposed and connected to force said well drilling mud tangentially into the base of an inverted generally conical liquid-liquid cyclone separation chamber, means for adding water to said drilling mud prior to said tangential introduction into said chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber, and a gas drier, a gas analyzer, and a vacuum pump disposed in said gas outlet tube.

5. A system for extracting and analyzing gas from well drilling mud from a well comprising in combination pumping means disposed and connected to force said well drilling mud down said well through said drilling zone and up said well tangentially into the base of an inverted generally conical liquid-liquid cyclone separation chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber, and a gas drier, and a gas analyzer disposed in said gas outlet tube.

6. A system for extracting and analyzing gas from well drilling mud comprising in combination pumping means disposed and connected to force said well drilling mud tangentially into the base of an inverted generally conical liquid-liquid cyclone separation chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber, and a gas drier, and a gas analyzer disposed in said gas outlet tube.

7. A system for extracting gas from well drilling mud from a well comprising in combination pumping means disposed and connected to force said well drilling mud down said well through said drilling zone and up said well tangentially into the base of an inverted generally conically liquid-liquid cyclone separation chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber.

8. A system for extracting and analyzing gas from well drilling mud comprising in combination pumping means disposed and connected to force said well drilling mud tangentially into the base of an inverted generally conical liquid-liquid cyclone separation chamber, said chamber having an axial overflow outlet adjacent the base of said cone, an axial underflow outlet adjacent the apex of said cone, and a gas outlet tube disposed axially adjacent said base and positioned to draw gas out of the resulting vortex in the drilling mud in said chamber, and a constant downstream pressure regulating valve, a gas drier, a gas analyzer, and a vacuum pump disposed in said gas outlet tube.

References Cited in the file of this patent

UNITED STATES PATENTS

| | | |
|---|---|---|
| 1,755,780 | Hawley | Apr. 22, 1930 |
| 2,156,333 | Cross et al. | May 2, 1939 |
| 2,749,748 | Slobod et al. | June 12, 1956 |
| 2,816,490 | Boadway et al. | Dec. 17, 1957 |